United States Patent [19]

Spurgeon et al.

[11] Patent Number: 5,435,816
[45] Date of Patent: Jul. 25, 1995

[54] METHOD OF MAKING AN ABRASIVE ARTICLE

[75] Inventors: Kathryn M. Spurgeon, River Falls, Wis.; Scott R. Culler, Burnsville, Minn.; David H. Hardy, New Richmond, Wis.; Gary L. Holmes, Vadnais Heights, Minn.

[73] Assignee: Minnesota Mining and Manufacturing Company, St. Paul, Minn.

[21] Appl. No.: 175,694

[22] Filed: Dec. 30, 1993

Related U.S. Application Data

[63] Continuation of Ser. No. 004,929, Jan. 14, 1993, abandoned.

[51] Int. Cl.$^6$ .............................................. B24D 11/02
[52] U.S. Cl. ................................... 51/295; 51/298
[58] Field of Search ................ 51/293, 295, 298, 309

[56] References Cited

U.S. PATENT DOCUMENTS

| | | | |
|---|---|---|---|
| 2,115,897 | 5/1938 | Wooddell et al. | 51/188 |
| 2,252,683 | 8/1941 | Albertson | 51/293 |
| 2,292,261 | 8/1942 | Albertson | 51/195 |
| 2,952,951 | 9/1960 | Simpson | 51/193 |
| 4,311,489 | 1/1982 | Kressner | 51/298 |
| 4,318,766 | 3/1982 | Smith | 156/330 |
| 4,642,126 | 2/1987 | Zador et al. | 51/295 |
| 4,652,274 | 3/1987 | Boettcher et al. | 51/298 |
| 4,652,275 | 3/1987 | Bloecher et al. | 51/298 |
| 4,751,138 | 6/1988 | Tumey et al. | 428/323 |
| 4,773,920 | 9/1988 | Chasman et al. | 51/295 |
| 4,799,939 | 1/1989 | Bloecher et al. | 51/293 |
| 4,903,440 | 2/1990 | Larson et al. | 51/298 |
| 4,952,612 | 8/1990 | Brown-Wensley et al. | 522/25 |
| 4,985,340 | 1/1991 | Palazzotto et al. | 420/270 |
| 5,014,468 | 5/1991 | Ravipati et al. | 51/295 |
| 5,015,266 | 5/1991 | Yamamoto | 51/293 |
| 5,055,113 | 10/1991 | Larson et al. | 51/298 |
| 5,086,086 | 2/1992 | Brown-Wensley et al. | 522/25 |
| 5,107,626 | 4/1992 | Mucci | 51/281 |
| 5,152,917 | 10/1992 | Pieper et al. | 51/295 |
| 5,178,646 | 1/1993 | Barber, Jr. et al. | 51/307 |
| 5,219,462 | 6/1993 | Bruxvoort et al. | 51/293 |

FOREIGN PATENT DOCUMENTS

| | | |
|---|---|---|
| 49642/69 | 7/1970 | Australia . |
| 2009718 | 8/1990 | Canada . |
| 0045014 | 2/1982 | European Pat. Off. . |
| 109581 | 5/1984 | European Pat. Off. . |
| 306161 | 3/1989 | European Pat. Off. . |
| 306162 | 3/1989 | European Pat. Off. . |
| 0396150 | 11/1990 | European Pat. Off. . |
| 500369 | 8/1992 | European Pat. Off. . |
| 1704911 | 12/1971 | Germany . |
| 58-196974 | 11/1983 | Japan . |
| 2-83172 | 3/1990 | Japan . |
| 4-159084 | 6/1992 | Japan . |
| 282466 | 12/1964 | Netherlands . |

*Primary Examiner*—Deborah Jones
*Attorney, Agent, or Firm*—Gary L. Griswold; Walter N. Kirn; Ramon R. Hoch

[57] ABSTRACT

This invention provides a method of making an abrasive article. The method of this invention comprises the steps of:
  a. providing a backing having a front surface;
  b. providing a radiation energy transmissive production tool having a contacting surface;
  c. applying a mixture comprising a plurality of abrasive particles and a binder precursor onto the contacting surface of the production tool;
  d. causing the mixture on the contacting surface of the production tool to come into contact with the front surface of the backing such that the mixture wets the front surface of the backing;
  e. transmitting radiation energy through the production tool to at least partially cure the binder precursor to form a shaped, handleable structure; and
  f. separating the shaped, handleable structure from the production tool.

The shaped, handleable structure can be fully cured to form a coated abrasive article.

45 Claims, 1 Drawing Sheet

METHOD OF MAKING AN ABRASIVE ARTICLE

This is a continuation of application Ser. No. 08/004,929 filed Jan. 14, 1993, now abandoned.

BACKGROUND OF THE INVENTION

1. Field of the Invention

This invention relates to a method of making an abrasive article, more particularly, a method involving curing a binder precursor by means of radiation energy.

2. Discussion of the Art

A coated abrasive article typically comprises a plurality of abrasive particles bonded to a backing by means of one or more binders. Examples of typical binders include the following cured resins: phenolic resins, aminoplast resins, urethane resins, epoxy resins, ethylenically unsaturated resins, acrylated isocyanurate resins, urea-formaldehyde resins, isocyanurate resins, acrylated urethane resins, acrylated epoxy resins, and mixtures thereof, with cured phenolic resins being the most popular binder. Most coated abrasive articles are made by a continuous process in which a backing is first coated with a binder precursor and abrasive particles. Then, the binder precursor is cured to form a binder. This curing process results in the polymerization and solidification of the binder precursor. In some instances, it is desirable to mold a coated abrasive to impart a pattern on its abrasive surface. The molding process will provide a reproducible coating having precisely shaped abrasive particles. If the binder precursor is a thermally curable resin, the thermal cure cycle may be over 10 hours in duration. This length of cure cycle is excessively long, and, in many instances, is impractical for preparing coated abrasive articles having precisely shaped abrasive particles. It is desired to develop a process having a short cycle time for preparing a coated abrasive article having a surface bearing precisely shaped abrasive composites.

SUMMARY OF THE INVENTION

This invention provides a method of making an abrasive article.

In general, the method of this invention comprises the steps of:

a. providing a mixture comprising abrasive particles and a binder precursor;

b. providing a backing having a front surface;

c. positioning the backing with respect to a radiation energy transmissive production tool having a contacting surface, such that the front surface of the backing faces the contacting surface of the production tool to define a mixture receiving space between the contacting surface of the production tool and the front surface of the backing;

d. introducing the mixture of step (a) into the mixture receiving space;

e. transmitting radiation energy through the production tool to at least partially cure the binder precursor to provide a shaped, handleable structure; and f. separating the shaped, handleable structure from the production tool.

For a variety of reasons, one of which is economy, it is often desired to completely fill the mixture receiving space with the mixture.

In one embodiment, the method of this invention comprises the steps of:

a. providing a backing having a front surface;

b. providing a radiation energy transmissive production tool having a contacting surface;

c. applying a mixture comprising a plurality of abrasive particles and a binder precursor onto the contacting surface of the production tool;

d. causing the mixture on the contacting surface of the production tool to come into direct contact with the front surface of the backing such that the mixture wets the front surface of the backing;

e. transmitting radiation energy through the production tool to at least partially cure the binder precursor, whereby the mixture is converted into shaped, handleable structure; and f. separating the shaped, handleable structure from the production tool.

In a second embodiment of the method of this invention, the mixture is applied to the front surface of the backing; the contacting surface of the radiation energy transmissive production tool is brought into direct contact with the mixture such that the mixture wets the contacting surface of the production tool; radiation energy is then transmitted through the production tool to at least partially cure the binder precursor, whereby the mixture is converted into a shaped, handleable structure; and the shaped, handleable structure is separated from the production tool.

The mixture comprises a plurality of abrasive particles and a binder precursor. The binder precursor is in a liquid state and has not been polymerized or cured. Because the mixture is in a liquid state, it is able to flow; it can be coated either onto a surface of backing or onto a surface of the production tool. The binder precursor of the mixture can be partially cured by exposure to a source of radiation energy. Partial curing results in solidification of the binder precursor to form a binder. When the binder is partially cured, the resulting solidified mixture is called a shaped, handleable structure. When the binder in the shaped, handleable structure is fully cured, the combination of the backing and the shaped, handleable structure is called a coated abrasive article.

Examples of sources of radiation energy include electron beam, ultraviolet light, and visible light. The production tool should be made from a material that does not absorb appreciable amounts of radiation energy. Because the radiation energy is transmitted through the tool and into the mixture, backings that absorb radiation energy can be used because the radiation energy is not required to be transmitted through the backing.

The surface of the production tool that comes into contact with the mixture preferably contains cavities or recesses that are disposed in a pattern. During the process of this invention, the mixture will wet into and preferably fill out these cavities. Because the binder precursor is at least partially cured on the surface of the production tool, the resulting abrasive article will have a topographical pattern essentially corresponding to the inverse of the pattern on the production tool.

The method of the present invention allows the use of backings that cannot be penetrated by ultraviolet or visible radiation, e.g., backings that are very thick or opaque or both. Moreover, in the case of abrasive composites having a pyramidal shape, the apex of the pyramid can be made to receive a higher dose of radiation, thereby resulting in abrasive composites having hard tips, without the need for a post cure step.

Detailed Description

This invention provides a method of making an abrasive article comprising a backing having a plurality of abrasive particles adhered thereto by means of a binder.

Figure 1:
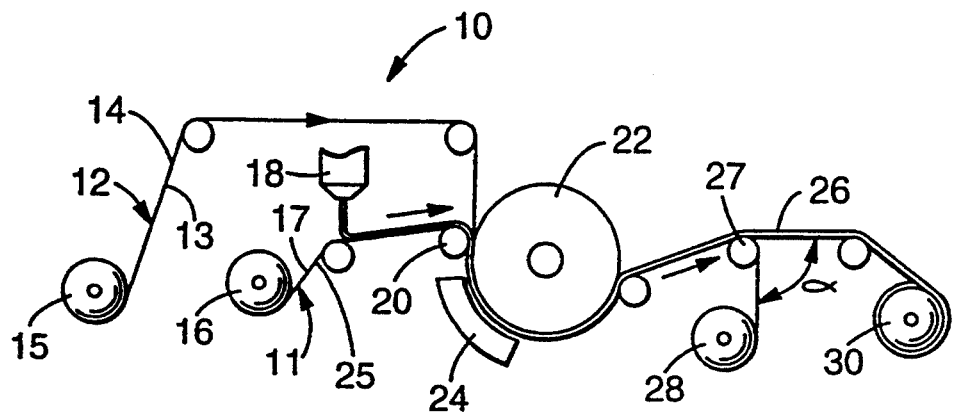
FIG. 1 is a schematic view of an apparatus for preparing an abrasive article according to the method of this invention.

FIG. 1 illustrates an apparatus 10 for making an abrasive article. A production tool 11 is in the form of a belt having two major surfaces and two ends. A backing 12 having a front surface 13 and a back surface 14 leaves an unwind station 15. At the same time, the production tool 11 leaves an unwind station 16. The contacting surface 17 of production tool 11 is coated with a mixture of abrasive particles and binder precursor at coating Station 18. The mixture can be heated to lower the viscosity thereof prior to the coating step. The coating station 18 can comprise any conventional coating means, such as knife coater, drop die coater, curtain coater, vacuum die coater, or an extrusion die coater. After the contacting surface 17 of production tool 11 is coated, the backing 12 and the production tool 11 are brought together such that the mixture wets the front surface 13 of the backing 12. In FIG. 1, the mixture is forced into contact with the backing 12 by means of a contact nip roll 20, which also forces the production tool/mixture/backing construction against a support drum 22. Next, a sufficient dose of radiation energy is transmitted by a source of radiation energy 24 through the back surface 25 of production tool 11 and into the mixture to at least partially cure the binder precursor, thereby forming a shaped, handleable structure 26. The production tool 11 is then separated from the shaped, handleable structure 26. Separation of the production tool 11 from the shaped, handleable structure 26 occurs at roller 27. The angle α between the shaped, handleable structure 26 and the production tool 11 immediately after passing over roller 27 is preferably steep, e.g., in excess of 30°, in order to bring about clean separation of the shaped, handleable structure 26 from the production tool 11. The production tool 11 is rewound on mandrel 28 so that it can be reused. Shaped, handleable structure 26 is wound on mandrel 30. If the binder precursor has not been fully cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article. As used herein, the phrase "full cure" and the like means that the binder precursor is sufficiently cured so that the resulting product will function as an abrasive article, e.g. a coated abrasive article.

After the abrasive article is formed, it can be flexed and/or humidified prior to converting. The abrasive article can be converted into any desired form such as a cone, endless belt, sheet, disc, etc. before use.

Figure 2:
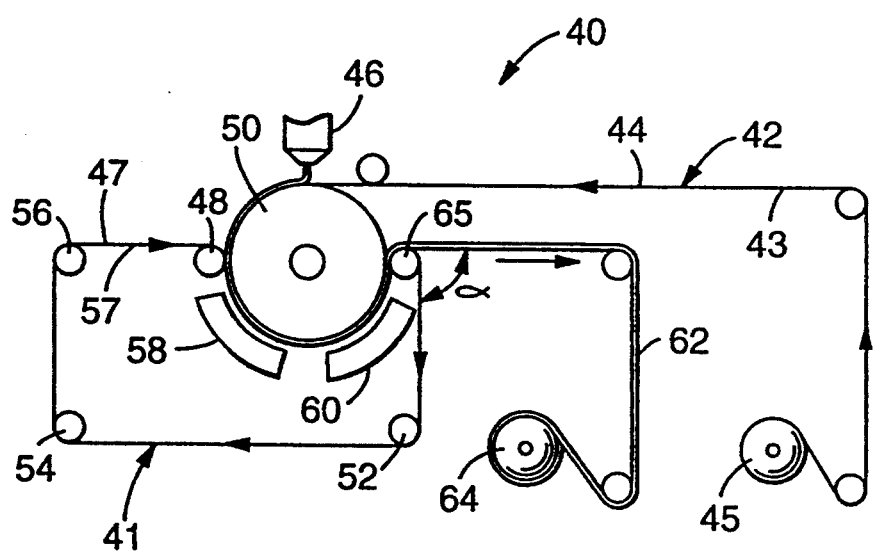
FIG. 2 is a schematic view of another apparatus for preparing an abrasive article according to the method of this invention.

FIG. 2 illustrates an apparatus 40 for an alternative method of preparing an abrasive article. In this apparatus, the mixture is coated onto the backing rather than onto the production tool. In this apparatus, the production tool 41 is an endless belt having a front surface and a back surface. A backing 42 having a back surface 43 and a front surface 44 leaves an unwind station 45. The front surface 44 of the backing is coated with a mixture of abrasive particles and binder precursor at a coating station 46. The mixture is forced against the contacting surface 47 of the production tool 41 by means of a contact nip roll 48, which also forces the production tool/mixture/backing construction against a support drum 50, such that the mixture wets the contacting surface 47 of the production tool 41. The production tool 41 is driven over three rotating mandrels 52, 54, and 56. Radiation energy is then transmitted through the back surface 57 of production tool 41 and into the mixture to at least partially cure the binder precursor. There may be one source of radiation energy 58. There may also be a second source of radiation energy 60. These energy sources may be of the same type or of different types. After the binder precursor is at least partially cured, the shaped, handleable structure 62 is separated from the production tool 41 and wound upon a mandrel 64. Separation of the production tool 41 from the shaped, handleable structure 62 occurs at roller 65. The angle α between the shaped, handleable structure 62 and the production tool 41 immediately after passing over roller 65 is preferably steep, e.g., in excess of 30°, in order to bring about clean separation of the shaped, handleable structure 62 from the production tool 41. If the binder precursor has not been fully cured, it can then be fully cured by exposure to an additional energy source, such as a source of thermal energy or an additional source of radiation energy, to form the coated abrasive article. Alternatively, full cure may eventually result without the use of an additional energy source to form the coated abrasive article.

After the abrasive article is formed, it can be flexed and/or humidified prior to converting. The abrasive article can be converted into any desired form such as a cone, endless belt, sheet, disc, etc. before use.

In either embodiment, it is often desired to completely fill the space between the contacting surface of the production tool and the front surface of the backing with the mixture of abrasive particles and binder precursor.

Backings suitable for use in the method of this invention have a front surface and a back surface. Representative examples of materials useful for preparing backings include polymeric film, primed polymeric film, unsized cloth, presized cloth, unsized paper, presized paper, vulcanized fiber, nonwovens and combinations thereof. The backing can be transmissive to or opaque to ultraviolet or visible radiation, or transmissive to or opaque to both ultraviolet and visible radiation. The backing may also be subjected to a treatment or treatments to seal the backing or modify some physical properties of the backing, or both. These treatments are well-known in the art. For example, cloth backings may contain a saturant coat, a backsize coat, a presize coat, or any combination thereof. The saturant coat saturates the backing and fills in the small openings in the backing. The backsize coat, which is applied to the backside of the backing, can protect the fibers or yarns during use. The presize coat is applied to the front side of the backing. The presize coat on the front side of the cloth functions to seal the cloth. Examples of resins useful for treating cloth include phenolics, latexes, epoxies, acrylates, acrylated epoxies, acrylated urethanes, polyesters, starches, and combinations thereof. The resins for treating cloth may further comprise additives, such as, for example, fillers, fibers, coupling agents, wetting agents, dyes, and pigments.

The mixture to be used to form abrasive composites comprises a plurality of abrasive particles dispersed in a binder precursor. As used herein, the term "mixture" means any composition comprising a plurality of abrasive particles dispersed in a binder precursor. It is preferred that the mixture be flowable. However, if the mixture is not flowable, it can be extruded or forced by other means, e.g. heat or pressure or both, onto the contacting surface of the production tool or onto the front surface of the backing. The mixture can be characterized as being conformable, that is, it can be forced to take on the same shape, outline, or contour as the contacting surface of the production tool and the front surface of the backing.

The abrasive particles typically have a size ranging from about 0.1 to 1500 micrometers, usually from about 1 to 400 micrometers. It is preferred that the abrasive particles have a Mohs' hardness of at least about 8, more preferably above 9. However, the particles can have a Mohs' hardness value lower than 8. Examples of abrasive particles suitable for use in this invention include fused aluminum oxide, ceramic aluminum oxide, heat treated aluminum oxide, white aluminum oxide, green silicon carbide, silicon carbide, alumina zirconia, diamond, ceria, cubic boron nitride, garnet, and combinations thereof. The phrase "abrasive particles" includes both individual abrasive grits and a plurality of individual abrasive grits bonded together to form an agglomerate. Abrasive agglomerates are further described in U.S. Pat. Nos. 4,311,489; 4,652,275; and 4,799,939, incorporated herein by reference.

The binder precursor is capable of being cured by energy, preferably radiation energy, more preferably, radiation energy from ultraviolet light, visible light, or electron beam sources. Other sources of energy include infrared, thermal, and microwave. It is preferred that the energy not adversely affect the production tool used in the method of the invention, so that the tool can be reused. The binder precursor can polymerize via a free radical mechanism or a cationic mechanism. Examples of binder precursors that are capable of being polymerized by exposure to radiation energy include acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof. The term "acrylate" includes acrylates and methacrylates.

Acrylated urethanes are diacrylate esters of hydroxy terminated NCO extended polyesters or polyethers. Examples of commercially available acrylated urethanes include "UVITHANE 782", available from Morton Thiokol Chemical, and "CMD 6600", "CMD 8400", and "CMD 8805", available from Radcure Specialties.

Acrylated epoxies are diacrylate esters of epoxy resins, such as the diacrylate esters of bisphenol A epoxy resin. Examples of commercially available acrylated epoxies include "CMD 3500", "CMD 3600", and "CMD 3700", available from Radcure Specialties.

Ethylenically unsaturated compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically unsaturated compounds preferably have a molecular weight of less than about 4,000. The preferred ethylenically unsaturated compounds are esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of ethylenically unsaturated compounds include methyl methacrylate, ethyl methacrylate, styrene, divinylbenzene, vinyl toluene,, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other ethylenically unsaturated compounds include monoallyl, polyallyl, and polymethallyl esters and amides of carboxylic acids, such as diallyl phthalate, diallyl adipate, and N,N-diallyladipamide. Still other nitrogen-containing ethylenically unsaturated compounds include tris(2-acryloyloxyethyl)isocyanurate, 1,3,5-tri(2-methyacryloxyethyl)-striazine, acrylamide, methacrylamide, N-methylacrylamide, N,N-dimethylacrylamide, N-vinylpyrrolidone, and N-vinylpiperidone.

Aminoplast resins suitable for this invention have at least one pendant $\alpha,\beta$-unsaturated carbonyl group per molecule or oligomer. These materials are further described in U.S. Pat. No. 4,903,440 and U.S. Ser. No. 07/659,752, filed Feb. 24, 1991, both of which are incorporated herein by reference.

Isocyanurate derivatives having at least one pendant acrylate group and isocyanate derivatives having at least one pendant acrylate group are further described in U.S. Pat. No. 4,652,275, incorporated herein by reference. The preferred isocyanurate derivative is a triacrylate of tris(hydroxy ethyl) isocyanurate.

Epoxy resins have an oxirane ring and are polymerized by opening of the ring. Epoxy resins suitable for this invention include monomeric epoxy resins and oligomeric epoxy resins. Representative examples of epoxy resins preferred for this invention include 2,2-bis[4-(2,3-epoxypropoxy)phenylpropane](diglycidyl ether of bisphenol) and commercially available materials under the trade designation "Epon 828", "Epon 1004", and "Epon 1001F",available from Shell Chemical Co., "DER-331", "DER-332", and "DER-334", available from Dow Chemical Co. Other epoxy resins suitable for this invention include glycidyl ethers of phenol formaldehyde novolac (e.g., "DEN-431" and "DEN-428", available from Dow Chemical Co.). Epoxy resins useful in this invention can polymerize via a cationic mechanism in the presence of one or more appropriate photoinitiators. These resins are further described in U.S. Pat. No. 4,318,766, incorporated herein by reference.

If either ultraviolet radiation or visible radiation is to be used, it is preferred that the binder precursor further comprise a photoinitiator. Examples of photoinitiators that generate a free radical source include, but are not limited to, organic peroxides, azo compounds, quinones, benzophenones, nitroso compounds, acyl halides, hydrazones, mercapto compounds, pyrylium compounds, triacrylimidazoles, bisimidazoles, phosphene oxides, chloroalkyltriazines, benzoin ethers, benzil ketals, thioxanthones, acetophenone derivatives, and combinations thereof.

Cationic photoinitiators generate an acid source to initiate the polymerization of an epoxy resin. Cationic photoinitiators can include a salt having an onium cation and a halogen containing a complex anion of a metal or metalloid. Other cationic photoinitiators include a salt having an organometallic complex cation and a halogen containing complex anion of a metal or metalloid. These are further described in U.S. Pat. No. 4,751,138, incorporated herein by reference (column 6, line 65 to column 9, line 45). Another example of a cationic photoinitiator is an organometallic salt and an onium salt described in U.S. Pat. No. 4,985,340 (column 4, line 65 to column 14, line 50); European Patent Applications 306,161; 306,162; all of which are incorporated herein by reference. Still other cationic photoinitiators include an ionic salt of an organometallic complex in which the metal is selected from the elements of Periodic Group IVB, VB, VIB, VIIB and VIIIB, as described in European Patent Application 109,581, incorporated herein by reference.

In addition to the radiation curable resins, the binder precursor may further comprise resins that are curable by sources of energy other than radiation energy, such as condensation curable resins. Examples of such condensation curable resins include phenolic resins, melamine-formaldehyde resins, and urea-formaldehyde resins.

The binder precursor can further comprise optional additives, such as, for example, fillers (including grinding aids), fibers, lubricants, wetting agents, surfactants, pigments, dyes, coupling agents, plasticizers, and suspending agents. An example of an additive to aid in flow properties has the trademark "OX-50", commercially available from DeGussa. The amounts of these materials can be adjusted to provide the properties desired. Examples of fillers include calcium carbonate, silica, quartz, aluminum sulfate, clay, dolomite, calcium metasilicate, and combinations thereof. Examples of grinding aids include potassium tetrafluoroborate, cryolite, sulfur, iron pyrites, graphite, sodium chloride, and combinations thereof. The mixture can contain up to 70% by weight filler or grinding aid, typically up to 40% by weight, and preferably from 1 to 10% by weight, most preferably from 1 to 5% by weight.

The mixture can be prepared by mixing the ingredients, preferably by a low shear mixer. A high shear mixer can also be used. Typically, the abrasive particles are gradually added into the binder precursor. Additionally, it is possible to minimize the amount of air bubbles in the mixture. This can be accomplished by pulling a vacuum during the mixing step.

During the manufacture of the shaped, handleable structure, radiation energy is transmitted through the production tool and into the mixture to at least partially cure the binder precursor. The phrase "partial cure" means that the binder precursor is polymerized to such a state that the resulting mixture releases from the production tool. The binder precursor can be fully cured once it is removed from the production tool by any energy source, such as, for example, thermal energy or radiation energy. The binder precursor can also be fully cured before the shaped, handleable structure is removed from the production tool.

Sources of radiation energy preferred for this invention include electron beam, ultraviolet light, and visible light. Other sources of radiation energy include infrared and microwave. Thermal energy can also be used. Electron beam radiation, which is also known as ionizing radiation, can be used at a dosage of about 0.1 to about 10 Mrad, preferably at a dosage of about 1 to about 10 Mrad. Ultraviolet radiation refers to non-particulate radiation having a wavelength within the range of about 200 to about 400 nanometers, preferably within the range of about 250 to 400 nanometers. It is preferred that ultraviolet radiation be provided by ultraviolet lights at a dosage of 100 to 300 Watts/cm. Visible radiation refers to non-particulate radiation having a wavelength within the range of about 400 to about 800 nanometers, preferably within the range of about 400 to about 550 nanometers.

In the method of this invention, the radiation energy is transmitted through the production tool and directly into the mixture. It is preferred that the material from which the production tool is made not absorb an appreciable amount of radiation energy or be degraded by radiation energy. For example, if electron beam energy is used, it is preferred that the production tool not be made from a cellulosic material, because the electrons will degrade the cellulose. If ultraviolet radiation or visible radiation is used, the production tool material should transmit sufficient ultraviolet or visible radiation, respectively, to bring about the desired level of cure.

The production tool should be operated at a velocity that is sufficient to avoid degradation by the source of radiation. Production tools that have relatively high resistance to degradation by the source of radiation can be operated at relatively lower velocities; production tools that have relatively low resistance to degradation by the source of radiation can be operated at relatively higher velocities. In short, the appropriate velocity for the production tool depends on the material from which the production tool is made.

The production tool can be in the form of a belt, e.g., an endless belt, a sheet, a continuous sheet or web, a coating roll, a sleeve mounted on a coating roll, or die. The surface of the production tool that will come into contact with the mixture can be smooth or can have a topography or pattern. This surface is referred to herein as the "contacting surface". If the production tool is in the form of a belt, sheet, web, or sleeve, it will have a contacting surface and a non-contacting surface. If the production tool is in the form of a roll, it will have a contacting surface only. The topography of the abrasive article formed by the method of this invention will have the inverse of the pattern of the contacting surface of the production tool. The pattern of the contacting surface of the production tool will generally be characterized by a plurality of cavities or recesses. The opening of these cavities can have any shape, regular or irregular, such as a rectangle, semicircle, circle, triangle, square, hexagon, octagon, etc. The walls of the cavities can be vertical or tapered. The pattern formed by the cavities can be arranged according to a specified plan or can be random. The cavities can butt up against one another.

Figure 3:
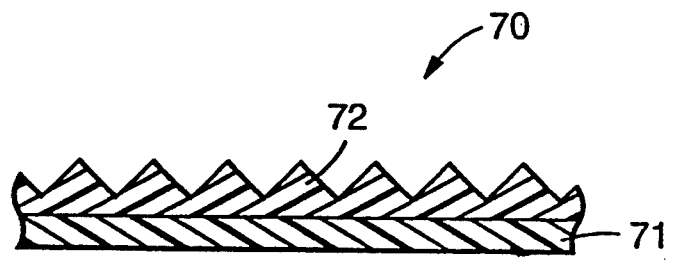
FIG. 3 is a sectional view of a segment of a production tool useful in the method of this invention.

Thermoplastic materials that can be used to construct the production tool include polyesters, polycarbonates, poly(ether sulfone), poly(methyl methacrylate), polyurethanes, polyvinylchloride, polyolefins, polystyrene, or combinations thereof. Thermoplastic materials can include additives such as plasticizers, free radical scavengers or stabilizers, thermal stabilizers, antioxidants, and ultraviolet radiation absorbers. These materials are substantially transparent to ultraviolet and visible radiation. One type of production tool is illustrated in FIG. 3. The production tool 70 comprises two layers 71 and 72. The surface of layer 71 is relatively flat and smooth. The surface of layer 72 has a pattern. Layer 71 exhibits high heat resistance and strength. Examples of materials suitable for layer 71 include polycarbonate and polyester. Layer 72 exhibits low surface energy. The material of low surface energy improves ease of release of the abrasive article from the production tool. Examples of materials suitable for layer 72 include polypropylene and polyethylene. In some production tools made of thermoplastic material, the operating conditions for making the abrasive article should be set such that excessive heat is not generated. If excessive heat is generated, this may distort or melt the thermoplastic tooling. In some instances, ultraviolet light generates heat. It should also be noted that a tool consisting of a single layer is also acceptable, and is the tool of choice in many instances.

A thermoplastic production tool can be made according to the following procedure. A master tool is first provided. The master tool is preferably made from metal, e.g., nickel. The master tool can be fabricated by any conventional technique, such as engraving, hobbing, knurling, electroforming, diamond turning, laser machining, etc. If a pattern is desired on the surface of the production tool, the master tool should have the inverse of the pattern for the production tool on the surface thereof. The thermoplastic material can be embossed with the master tool to form the pattern. Embossing can be conducted while the thermoplastic material is in a flowable state. After being embossed, the thermoplastic material can be cooled to bring about solidification.

The production tool can also be made of a cured thermosetting resin. A production tool made of thermosetting material can be made according to the following procedure. An uncured thermosetting resin is applied to a master tool of the type described previously. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation e.g. ultraviolet radiation.

A particularly useful production tool has been prepared by the following method. A master tool made of nickel and having a flat back surface and a front surface having the inverse of the desired surface topography of the production tool was placed on a level surface with the front surface facing up. A dike surrounding the front surface of the master tool was formed by laying appropriate lengths of ¼-inch square steel stock around the edges of the master tool. The dike was bonded to the master tool with a bead of "3M Express" vinyl polysiloxane impression material (Minnesota Mining and Manufacturing Company). An elastomer ("Sylgard #184", Dow Corning Corporation) was catalyzed according to the manufacturer's recommendation and then poured onto the front surface of the master tool in sufficient quantity to give a layer having a depth of 1/16-inch to ⅛-inch. The assembly was allowed to stand at room temperature for eight hours to allow air bubbles to dissipate and a gel to form. The assembly was then moved into an oven and held at a temperature of 49° C. for 24 hours to fix the dimensions of the elastomer. A cure of four hours duration at a temperature of 204° C. provided an elastomer with maximum mechanical strength. After cooling, the elastomeric production tool was separated from the master tool and the edges of the production tool trimmed. The finished elastomeric production tool can then be used to produce abrasive articles according to the method of this invention.

The contacting surface of the production tool may also contain a release coating to permit easier release of the abrasive article from the production tool. Examples of such release coatings include silicones and fluorochemicals.

The following non-limiting examples will further illustrate the invention. All parts, percentages, ratios, etc, in the examples are by weight unless indicated otherwise.

Test Procedure I

The coated abrasive article was converted into 7.6 cm by 335 cm endless belt and tested on a constant load surface grinder. A preweighed 1018 mild steel workpiece having dimensions approximately 2.5 cm by 5 cm by 18 cm was mounted in a holder. The workpiece was positioned vertically, with the 2.5 cm by 18 cm face in contact with a serrated rubber contact wheel (85 Shore A durometer; approximately 36 cm diameter) with one on one lands over which was entrained the coated abrasive belt. The workpiece was then reciprocated vertically through an 18 cm path at the rate of 20 cycles per minute, while a spring loaded plunger urged the workpiece against the belt with a load of 4.5 kg as the belt was driven at about 2050 meters per minute. After one minute elapsed grinding time, the workpiece holder assembly was removed and the work piece re-weighed, the amount of stock removed calculated by subtracting the weight after abrading from the original weight. A new, pre-weighed workpiece and holder were mounted on the equipment. The test endpoint in minutes is recorded in the appropriate tables, i.e., Table 1 and Table 2.

Test Procedure II

Test Procedure II was essentially the same as Test Procedure I except that the test endpoint was five minutes and the workpiece was 304 stainless steel.

EXAMPLE 1

The backing for this example was a J weight rayon backing. The backing had a latex/phenolic resin presize treatment (85 parts latex/15 parts phenolic resin based upon a cured resin) on the front side of the backing. The presize treatment had been applied to the backing and then heated to substantially remove any volatiles and to gel the phenolic resin.

The abrasive article for this example was made on the apparatus illustrated in FIG. 1. The production tool was made of polypropylene and was embossed off a diamond turned nickel master tool that had a pattern consisting of pyramids placed such that their bases were butted up against one another. The width of the base of the pyramid was about 350 to 400 micrometers and the height of the pyramid was about 350 to 400 micrometers. This type of pattern was illustrated in FIG. 1 of U.S. Pat. No. 5,152,917.

The binder precursor consisted of triacrylate of tris(-hydroxy ethyl)isocyanurate (50 parts), trimethylol propane triacrylate (50 parts), amorphous silica filler (1 part), commercially available from Degussa under the trade designation "OX-50", methacrylate silane coupling agent (0.5 part), and 2,2-dimethoxy-1-2-diphenyl-1-ethanone photoinitiator (0.5 part), commercially available from Ciba Geigy Company under the trade designation "Irgacure 651". White fused aluminum oxide abrasive particles (average size of 40 micrometers) were gradually added into the binder precursor such that the resulting mixture consisted of 2.3 parts abrasive particles to 1 part binder precursor. The source of radiation energy was one ultraviolet light operating at 118 Watts/cm. The process was a continuous process operating at a web speed of approximately 2.4 meters/minute. After the abrasive article was removed from the apparatus, it was heated for eight hours at 100° C. to fully cure the latex/phenolic backing treatment. The abrasive article was not flexed prior to testing.

Comparative Example A

The article of Comparative Example A was a conventional coated abrasive article. The backing was a polyethylene terephthalate film and the abrasive particles were 40 micrometer white aluminum oxide. The make coat and size coat comprised a resorcinol phenolic resin. The article is available from Minnesota Mining and Manufacturing Company, St. Paul, Minn., under the trade designation "IMPERIAL Microfinishing Film".

The abrasive articles from Example 1 and Comparative Example A were tested according to Test Procedure I. The results are set forth in Table 1.

TABLE 1

| Example no. | Initial cut (g) | Final cut (g) | Total cut (g) | Ra | Time (min) |
|---|---|---|---|---|---|
| Comp. A | 10.6 | 5.9 | 15.8 | 9 | 2 |
| 1 | 7.1 | 4.0 | 78.2 | — | 8 |

Example 2

The abrasive article for this example was prepared by the same method as was used in Example 1, with the following exceptions.

The photoinitiator was 2-benzyl-2-N,N-dimethylamino-1-(4-morpholinophenyl)-1-butanone, commercially available from Ciba Geigy Corp. under the trade designation "Irgacure 369". The photoinitiator was present at a concentration of 1% by weight of the binder precursor. The abrasive particles were grade P230 heat treated aluminum oxide. The source of radiation energy was one visible light operating at 236 watts/cm. The speed was approximately 15.2 meters/min.

Comparative Example B

The article of Comparative Example B was a conventional coated abrasive. The backing was the same as was used in Example 1 and the abrasive particles were grade P320 heat treated aluminum oxide. The make coat comprised a resorcinol phenolic resin; the size coat comprised a filled resin consisting of 65% resole phenolic resin and 35% cryolite. This product is available from Minnesota Mining and Manufacturing Company, St. Paul, Minn., under the trade designation P320 "Three-M-ite".

The coated abrasive articles from Example 1, Example 2, and Comparative Example B were tested according to Test Procedure I and Test Procedure II. The results of Test Procedure I are set forth in Table 2 and the results of Test Procedure II are set forth in Table 3.

TABLE 2

| Example no. | Initial cut (g) | Final cut (g) | Total cut (g) | Time (min) |
|---|---|---|---|---|
| Comp. B | 19.7 | 3.7 | 71.8 | 6.5 |
| 2 | 23.7 | 8.3 | 144.1 | 9 |

TABLE 3

| Example | Initial cut (g) | Final Cut (g) | Total cut (g) |
|---|---|---|---|
| 1 | 9.7 | 2.0 | 31.2 |
| Comp. B | 7.8 | 2.0 | 23.5 |

Example 2 shows the significantly increased cut obtainable with the precisely structured abrasive article when hard abrasive grits are used.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method for preparing a shaped, handleable structure suitable for making a coated abrasive article comprising the steps of:
   a. providing a mixture comprising abrasive particles, a binder precursor, and optionally, a photoinitiator;
   b. providing a backing having a front surface;
   c. positioning said backing with respect to a radiation energy transmissive production tool having a contacting surface so that said front surface of said backing faces said contacting surface of said production tool to define a mixture receiving space between said contacting surface of said production tool and said front surface of said backing;
   d. introducing said mixture of step (a) into said mixture receiving space;
   e. transmitting radiation energy through said production tool to at least partially cure said binder precursor to provide a shaped, handleable structure, said production tool continuously moving while said radiation energy is being transmitted through said production tool; and
   f. separating said shaped, handleable structure from said production tool.

2. The method of claim 1 wherein said contacting surface of said production tool contains cavities.

3. The method of claim 2 wherein said cavities are disposed in a non-random pattern.

4. The method of claim 1 wherein said backing comprises a material selected from the group consisting of polymeric film, untreated cloth, treated cloth, untreated paper, treated paper, vulcanized fiber, nonwovens, and combinations thereof.

5. The method of claim 1 wherein said abrasive particles comprise material selected from the group consisting of fused aluminum oxide, silicon carbide, alumina zirconia, diamond, ceria, cubic boron nitride, garnet, and combinations thereof.

6. The method of claim 1 wherein said abrasive particles have a Moh's hardness of at least about 8.

7. The method of claim 1 wherein said binder precursor is selected from the group consisting of acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof.

8. The method of claim 7 wherein said binder precursor further comprises a photoinitiator.

9. The method of claim 1 wherein said mixture is introduced into said mixture receiving space by means of a coater selected from the group consisting of knife coater, drop die coater, curtain coater, vacuum die coater, and extrusion die coater.

10. The method of claim 1 wherein said production tool is transmissive of ultraviolet radiation, visible radiation, or both ultraviolet radiation and visible radiation.

11. The method of claim 1 wherein said production tool comprises a thermoplastic resin, a thermosetting resin, or a radiation-curable resin.

12. The method of claim 1 wherein said production tool comprises an endless belt.

13. The method of claim 1 wherein said radiation energy is provided by a source selected from the group consisting of electron beam, ultraviolet radiation, and visible radiation.

14. The method of claim 1 wherein said backing is opaque to said radiation energy.

15. The method of claim 1, further comprising the step of fully curing the shaped handleable structure of step f.

16. A method for preparing a shaped, handleable structure for making a coated abrasive article comprising the steps of:
  a. providing a backing having a front surface;
  b. providing a radiation energy transmissive production tool having a contacting surface;
  c. applying a mixture comprising a plurality of abrasive particles a binder precursor, and optionally, a photoinitiator onto the contacting surface of said production tool;
  d. causing the mixture on the contacting surface of said production tool to come into contact with the front surface of said backing such that said mixture wets the front surface of said backing;
  e. transmitting radiation energy through said production tool to at least partially cure said binder precursor to provide a shaped, handleable structure, said production tool continuously moving while said radiation energy is being transmitted through said production tools; and
  f. separating said shaped, handleable structure from said production tool.

17. The method of claim 16 wherein said contacting surface of said production tool contains cavities.

18. The method of claim 17 wherein said cavities are disposed in a non-random pattern.

19. The method of claim 16 wherein said backing comprises a material selected from the group consisting of polymeric film, untreated cloth, treated cloth, untreated paper, treated paper, vulcanized fiber, nonwovens, and combinations thereof.

20. The method of claim 16 wherein said abrasive particles comprise material selected from the group consisting of fused aluminum oxide, silicon carbide, alumina zirconia, diamond, ceria, cubic boron nitride, garnet, and combinations thereof.

21. The method of claim 16 wherein said abrasive particles have a Moh's hardness of at least about 8.

22. The method of claim 16 wherein said binder precursor is selected from the group consisting of acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof.

23. The method of claim 22 wherein said binder precursor further comprises a photoinitiator.

24. The method of claim 16 wherein said mixture is applied by means of a coater selected from the group consisting of knife coater, drop die coater, curtain coater, vacuum die coater, and extrusion die coater.

25. The method of claim 16 wherein said production tool is transmissive of to ultraviolet radiation, visible radiation, or both ultraviolet radiation and visible radiation.

26. The method of claim 16 wherein said production tool comprises a thermoplastic resin, a thermosetting resin, or a radiation-curable resin.

27. The method of claim 16 wherein said radiation energy is provided by a source selected from the group consisting of electron beam, ultraviolet radiation, and visible radiation.

28. The method of claim 16 wherein said backing is opaque to said radiation energy.

29. The method of claim 16 wherein said production tool comprises an endless belt.

30. The method of claim 16, further comprising the step of fully curing the shaped, handleable structure of step f.

31. A method for preparing a shaped, handleable structure for making a coated abrasive article comprising the steps of:
  a. providing a backing having a front surface;
  b. providing a radiation energy transmissive production tool having a contacting surface;
  c. applying a mixture comprising a plurality of abrasive particles a binder precursor, and optionally, a photoinitiator to the front surface of said backing;
  d. causing said mixture on the front surface of said backing to come into direct contact with the contacting surface of said production tool such that said mixture wets the contacting surface of said production tool;
  e. transmitting radiation energy through said production tool to at least partially cure said binder precursor to provide a shaped, handleable structure, said production tool continuously moving while said radiation energy is being transmitted through said production tool; and
  f. separating said shaped, handleable structure from said production tool.

32. The method of claim 31 wherein said contacting surface of said production tool contains cavities.

33. The method of claim 32 wherein said cavities, are disposed in a non-random pattern.

34. The method of claim 31 wherein said backing comprises a material selected from the group consisting of polymeric film, untreated cloth, treated cloth, untreated paper, treated paper, vulcanized fiber, nonwovens, and combinations thereof.

35. The method of claim 31 wherein said abrasive particles comprise material selected from the group consisting of fused aluminum oxide, silicon carbide, alumina zirconia, diamond ceria, cubic boron nitride, garnet, and combinations thereof.

36. The method of claim 31 wherein said abrasive particles have a Moh hardness of at least about 8.

37. The method of claim 31 wherein said binder precursor is selected from the group consisting of acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, vinyl ethers, epoxy resins, and combinations thereof.

38. The method of claim 37 wherein said binder precursor further comprises a photoinitiator.

39. The method of claim 31 wherein said mixture is applied by means of a coater selected from the group consisting of knife coater, drop die coater, curtain coater, vacuum die coater, and extrusion die coater.

40. The method of claim 31 wherein said production tool is transmissive of ultraviolet radiation visible radiation, or both ultraviolet radiation and visible radiation.

41. The method of claim 31 wherein said production tool comprises a thermoplastic resin, a thermosetting resin, or a radiation-curable resin.

42. The method of claim 31 wherein said radiation energy is provided by a source is selected from the group consisting of electron beam, ultraviolet radiation, and visible radiation.

43. The method of claim 31 wherein said backing is opaque to said radiation energy.

44. The method of claim 21 wherein said production tool comprises an endless belt.

45. The method of claim 1, further comprising the step of fully curing the shaped, handleable structure of step f.

* * * * *

UNITED STATES PATENT AND TRADEMARK OFFICE
CERTIFICATE OF CORRECTION

PATENT NO. : 5,435,816
DATED : July 25, 1995
INVENTOR(S) : Kathryn M. Spurgeon, et al.

It is certified that error appears in the above-indentified patent and that said Letters Patent is hereby corrected as shown below:

Col. 2, line 32, "of backing" should read --of the backing--.

Col. 3, line 24, "Station" should read --station--.

Col. 6, line 17, "toluene,," should read --toluene,--.

Col. 6, line 51, "and "Epon 1001F",available" should read --and "Epon 1001F", available--.

Col. 13, line 5, "Moh's" should read --Mohs'--.

Col. 13, line 45, "particles a binder" should read --particles, a binder--.

Col. 14, line 7, "Moh's" should read --Mohs'--.

Col. 14, line 47, "particles a binder" should read --particles, a binder--.

Col. 15, line 6, "diamond ceria," should read --diamond, ceria,--.

Col. 15, line 9, "Moh " should read --Mohs'--.

UNITED STATES PATENT AND TRADEMARK OFFICE
CERTIFICATE OF CORRECTION

PATENT NO. : 5,435,816
DATED : July 25, 1995
INVENTOR(S) : Kathryn M. Spurgeon, et al.

It is certified that error appears in the above-indentified patent and that said Letters Patent is hereby corrected as shown below:

Col. 16, line 15, "claim 21" should read --claim 31--.

Signed and Sealed this

Nineteenth Day of November, 1996

Attest:

BRUCE LEHMAN

Attesting Officer
Commissioner of Patents and Trademarks

UNITED STATES PATENT AND TRADEMARK OFFICE
CERTIFICATE OF CORRECTION

PATENT NO. : 5,435,816
DATED : July 25, 1995
INVENTOR(S) : Kathryn M. Spurgeon, Scott R. Culler, David H. Hardy, and Gary L. Holmes It is certified that error appears in the above-indentified patent and that said Letters Patent is hereby corrected as shown below:

Column 11, line 56    "P230" should read --P320--

Signed and Sealed this

Twenty-fourth Day of December, 1996

Attest:

BRUCE LEHMAN

Attesting Officer         Commissioner of Patents and Trademarks